United States Patent [19]

Payne

[11] Patent Number: 4,508,973

[45] Date of Patent: Apr. 2, 1985

[54] WIND TURBINE ELECTRIC GENERATOR

[76] Inventor: James M. Payne, 2300 Mardale Dr., York, Pa. 17403

[21] Appl. No.: 613,808

[22] Filed: May 25, 1984

[51] Int. Cl.³ .............................................. F03D 3/04
[52] U.S. Cl. .................................... 290/5 S; 415/2 A
[58] Field of Search ...................... 290/44, 55, 42, 43, 290/53, 54; 415/2 A, 3 A, 4 A

[56] References Cited

U.S. PATENT DOCUMENTS

| 1,002,833 | 9/1911 | Giddings | 415/2 A |
|---|---|---|---|
| 3,883,750 | 5/1975 | Uzzell, Jr. | |
| 3,944,840 | 3/1976 | Troll | |
| 4,036,916 | 7/1977 | Agsten | 415/2 A |
| 4,079,264 | 3/1978 | Cohen | |
| 4,164,382 | 8/1979 | Mysels | |

FOREIGN PATENT DOCUMENTS

| 1062631 | 4/1954 | France | 415/2 A |
|---|---|---|---|
| 1025 | of 1908 | United Kingdom | 415/2 A |

Primary Examiner—B. Dobeck
Assistant Examiner—Shelley Wade
Attorney, Agent, or Firm—C. Hercus Just

[57] ABSTRACT

A wind-operated electric generator system of simple design incuding a stationary circular arrangement of segmental wind inlet passages extending around a vertical axis and having vertical inlet openings at the outer ends, the inlet openings having inwardly and upwardly curving walls extending from the inlet openings toward the central axis, the lower walls sloping upwardly an appreciably greater extent than the upper walls to form an inwardly and upwardly extending convergence with the inner portions of the upper walls to form constricted upwardly directed exit passages that merge into a Venturi throat in which a bladed impeller is mounted upon a vertical shaft which is connected to an electric generator, and the sides of the segmental inlet passages also converging toward the central axis and cooperating with the converging upper and lower walls to form an efficient Venturi effect to increase the speed of air currents directed to the impeller.

7 Claims, 3 Drawing Figures

U.S. Patent    Apr. 2, 1985    4,508,973
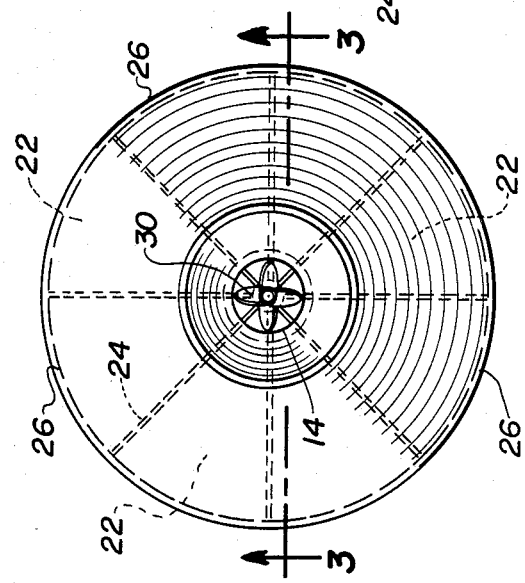
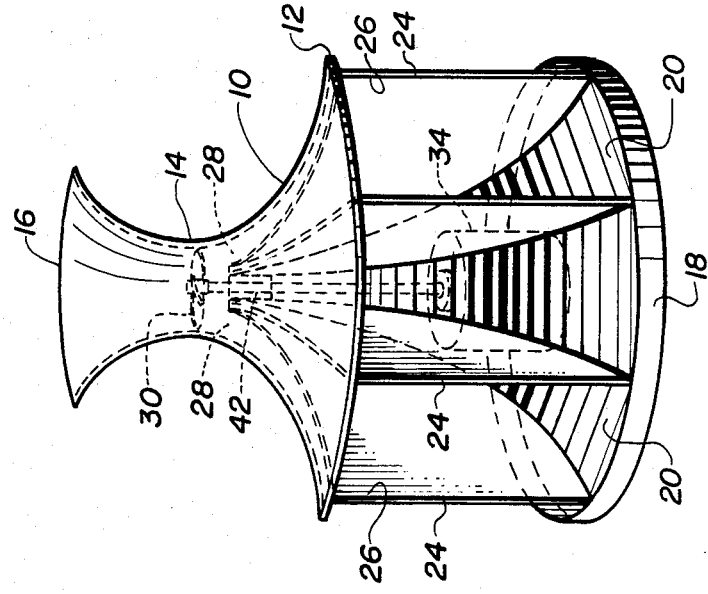

WIND TURBINE ELECTRIC GENERATOR

BACKGROUND OF THE INVENTION

For many years mankind has been challenged to harness the force of winds for beneficial purposes, one of the earliest attempts resulting in the production of windmills which date back to ancient times. In the more recent energy crunch, various efforts have been expended in attempting to develop electric energy from the force of winds and a number of prior developments comprise the subject matter of certain U.S. patents, such as U.S. Pat. No. 3,883,750 to Uzzell, Jr., dated May 13, 1975, in which a Venturi-shaped chamber is mounted for rotation on a support and a fan positioned within the throat of the chamber is driven by wind entering the same, the fan being connected to a generator or the like. Opposite ends of the chamber are flared outwardly in opposite direction.

Prior U.S. Pat. Nos. 4,079,264 to Cohen, dated Mar. 14, 1978, and 4,164,382 to Mysels, dated Aug. 14, 1979, respectively show segmental type inlet passages which direct incoming air through certain of said passages to a central, rotatable passage-forming means which in one patent is positioned by a sophisticated servo circuit responsive to the direction of the wind and, in the other patent, the passage-forming member is operated by a vane which is acted upon by the wind to maintain the passage-forming means in line therewith. The passage-forming means in both patents contain a fan or propeller member which drives a generator.

In still another prior U.S. Pat. No. 3,944,840, to Troll, dated Mar. 16, 1976, a conversion system which utilizes wind to generate electric power has a ratio-variable entrance and exit openings, the ratio being set by sensing the velocity of the incoming wind is directed to a vaned impeller mounted on a vertical axis and connected to a flywheel to attempt to steady the operation thereof and drive an electric generator. The present invention generally is directed to a more simple, yet highly efficient mechanism for utilizing wind power to generate electric current, as compared to the more complicated devices of the prior patents and especially those referred to above.

SUMMARY OF THE INVENTION

It is among the principal objects of the present invention to provide a stationary Venturi unit or structure in which a circular assembly of similar segmental wind inlet passages is provided which extend around a vertical axis, said passages each having a substantially vertical inlet opening at the outermost end, the sides of which are defined by vertical, radial sidewalls extending forward and converging relative to said central axis, said passages also being defined by upper and lower walls curved inwardly toward said axis and upwardly and the lower wall sloping upwardly to a greater extent than the upper walls and converging at the upper ends thereof toward the upper and inner portions of said upper walls to provide a constricted, upwardly directed exit passage from each segmental passage and all of said exit passages merging into a single upwardly directed discharge opening comprising a Venturi discharge throat in which a radial bladed impeller is mounted within said throat and supported by a shaft which is coincident with the axis of the Venturi throat, said shaft driving an electric generator comprising part of the system.

Another object of the invention is to form the walls which define said segmental wind inlet passages from sheet material such as suitable metal, plastic or otherwise, and connect said various walls at the edges thereof, whereby particularly the bottom walls define a shell having a compartment therebelow in which said generator is supported and a bearing for the shaft of said impeller preferably is mounted at the upper end of said shell.

A further object of the invention is to provide limited clearance between the outer ends of the blades of the impeller and the walls of said Venturi throat to provide for maximum efficiency in the engagement of the inlet air with the blades and the discharge end of said throat supporting an upwardly and outwardly flaring discharge member.

Still another object of the invention is to provide no less than eight similar segmental wind inlet passages whereby, regardless of the direction of the wind, at least two adjacent passages will receive the wind and thereby afford adequate force to be delivered to said impeller to operate the generator.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a perspective view of an exemplary structure embodying the principles of the present invention.

FIG. 2 is a top plan view of the structure shown in FIG. 1.

FIG. 3 is a sectional view of the structure shown in FIGS. 1 and 2 as seen on the line 3—3 in FIG. 2.

DETAILED DESCRIPTION OF THE PREFERRED EMBODIMENT OF THE INVENTION

Referring to the drawings and especially FIG. 2, it will be seen that the system provides a top wall 10 which curves inwardly from the outer edge 12 thereof and smoothly slopes upwardly to provide a constricted Venturi throat section 14 which is at the smallest diameter of the top and said top then extends upwardly and flares outwardly to form an exit 16 of greater diameter than the throat 14.

The system also includes a base 18 upon which, as best shown in FIG. 3, there is mounted a bottom wall member 20 which slopes inwardly and upwardly to a greater degree than the slope of the top wall 10. In cross section, the top wall 10 and bottom wall 20 preferably are substantially circular but the invention is not restricted thereto as will be seen hereinbelow.

To provide a plurality of similar segmental wind-inlet passages 22, there is provided between the top wall 10 and bottom wall 20 a plurality of segmental side walls 24 which are shaped as best shown in FIG. 3 between top wall 10 and bottom wall 20. The top and bottom edges thereof preferably are firmly connected to the inner surface of top wall 10 and upper surface of bottom wall 20. If formed from metal, suitable welding is appropriate to make such connection but any other means which is satisfactory to form a rigid construction may be employed to make such connections.

The outer vertical edges of the side walls 24 define vertical inlet openings 26 and from there, the segmental inlet passages converge both from the top and bottom as well as the opposite side to provide a constricted exit passage 28 at the upper end of each of said segmental passages, see FIG. 3, due to the termination of said upper ends of the side walls or vanes 24, terminating as shown and wherein they merge into a common, single Venturi discharge throat 14 in which a rotatable impeller 30 is positioned and wherein it is fixed to the upper end of a vertical shaft 32 which extends upward from an electric generator 34 which preferably is mounted within the compartment 36 defined by the inner surface of the bottom wall 20 which actually is in the form of a shell. Transverse strut members 38, shown in FIG. 3, and connected at the outer ends thereof to the bottom wall 20 can provide suitable support for the generator. Outlet conduit 40 extends from generator 34.

As can best be appreciated from FIG. 1, efficient and maximum convergence of both the side walls as well as the top and bottom walls serve to produce a very substantial Venturi effect at the throat 14 due to the imminence of the constricted exit passages 28 at the upper ends of each of the segmental passages 22. Further, while in the drawings and especially FIGS. 1 and 3, it appears that the top wall 10 and bottom wall 20 are smoothly curved and, as stated above, preferably are circular in cross-section, it is well within the purview of the present invention that each of said segmental passages may be formed by top and bottom walls which are planar transversely but curved inwardly and upwardly and welded or otherwise suitably secured at the edges thereof to form unitary top and bottom walls for the system. Also, shaft 32 is preferably provided with a suitable bearing, one example of which is illustrated as bearing 42, mounted for example upon the upper end of the bottom wall 20 as shown in FIG. 3.

From the foregoing, it will be seen that the present invention provides a highly efficient Venturi effect produced by a plurality of similar segmental wind inlet passages formed into a circular assembly thereof and due to the substantial convergence of the top and bottom walls of each segmental passage, together with the substantial convergence of the side walls thereof, maximum efficiency is afforded in providing a satisfactory Venturi effect. Further, a minimum of eight segmental passages is preferred in order that, regardless of the direction of the wind, at least two of the inlet openings of said segments will be positioned to capture the effect of the wind and direct it to the impeller 30 through a Venturi effect and all parts of the system, except the impeller, are stationary.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A wind-operated electric generator system comprising in combination, a stationary Venturi unit having a vertical axis and a circular assembly of similar segmental wind-inlet passages extending around said axis and having substantially vertical inlet openings outermost from said axis, said segmental inlet passages being defined by similar substantially vertical and radially extending walls comprising the sides of said segmental passages and said inlet openings also each having similar top and bottom walls curved inwardly toward said axis and upwardly and said bottom walls sloping upwardly to a greater extent than said top walls and converging at the upper ends thereof toward the upper and inner portions of said top wall to provide with the upper portions of said top walls constricted upwardly directed exit passages for wind merging into a single upwardly directed discharge opening comprising a Venturi discharge throat, whereby the converging of said walls toward the axis of the unit provides additional compression of incoming wind and thereby further enhances the increasing of inlet air speed generated by the converging top and bottom walls of said inlet passages, a radial bladed impeller mounted within said Venturi throat and supported by a shaft coincident with the axis of said Venturi throat, bearing means for said shaft, an electric generator supported relative to said shaft and connected thereto for operation thereby when driven by wind passing through said throat and the blades of said impeller to drive the same, whereby wind blowing from any direction will enter at least one of said inlet openings and be directed upwardly by the passage thereof while the speed thereof is increased by said Venturi effect produced by both lateral and vertical compression of the incoming gas.

2. The generator system according to claim 1 further including an upwardly and outwardly flaring discharge member terminating in atmosphere above said Venturi throat.

3. The generator system according to claim 1 in which said top and bottom walls and said vertical side walls of said segmental passages are formed from sheet material connected at adjacent edges.

4. The generator system according to claim 1 in which said upwardly curved bottom walls of said segmental inlet passages are connected at the edges and define a shell having a compartment therebelow in which said generator is supported.

5. The generator system according to claim 4 in which said shell supports at the upper end thereof said bearing for said shaft of said impeller.

6. The generator system according to claim 1 in which the diameter of said impeller is slightly less than the diameter of said throat to provide limited clearance therebetween, and the discharge end of said throat supporting an upwardly and outwardly flaring discharge member.

7. The generator according to claim 1 in which the number of segmental wind inlet passages is no less than eight, whereby regardless of the direction of the wind at least two adjacent passages will receive the wind and thereby afford adequate force to be delivered to said impeller to operate the generator.

* * * * *